Jan. 27, 1942. W. T. RUNALS 2,271,347
DRYING APPARATUS
Filed March 7, 1938 5 Sheets—Sheet 2

INVENTOR
William T. Runals
BY
Ely & Frye
ATTORNEYS

Jan. 27, 1942. W. T. RUNALS 2,271,347
DRYING APPARATUS
Filed March 7, 1938 5 Sheets-Sheet 3
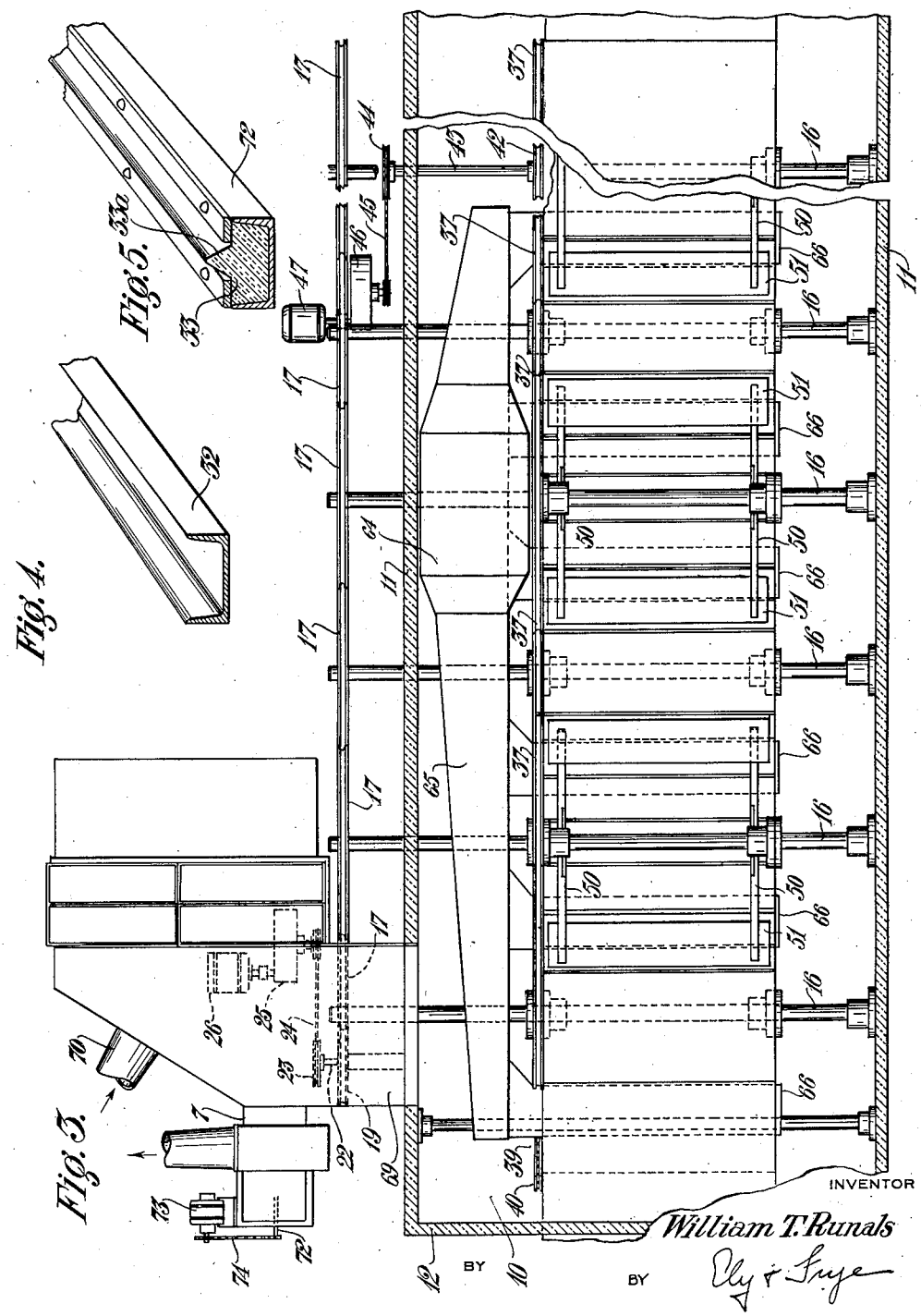
INVENTOR
William T. Runals
BY
ATTORNEYS

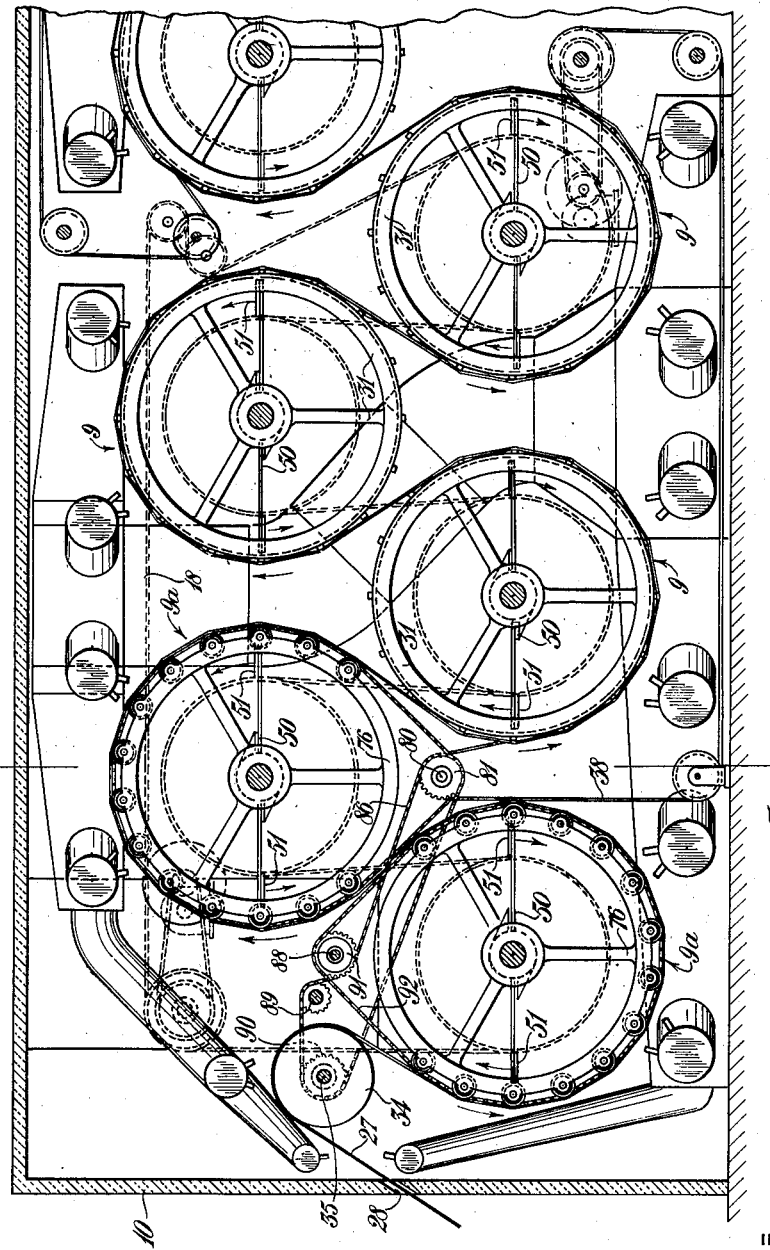

Jan. 27, 1942.          W. T. RUNALS                2,271,347
                       DRYING APPARATUS
                   Filed March 7, 1938         5 Sheets—Sheet 5

INVENTOR
William T. Runals
BY  Ely & Frye
ATTORNEYS

Patented Jan. 27, 1942

2,271,347

UNITED STATES PATENT OFFICE 2,271,347

DRYING APPARATUS

William T. Runals, Akron, Ohio, assignor to The Firestone Tire & Rubber Company, Akron, Ohio, a corporation of Ohio Application March 7, 1938, Serial No. 194,348

5 Claims. (Cl. 34—155)

This invention relates to drying apparatus, and more especially it relates to apparatus for drying continuous strip or sheet material.

The apparatus is of primary utility in the paper, textile and rubber industries for drying paper, fabric, webbing, and the like, that has been impregnated or compounded with resinous materials, natural or artificial aqueous dispersions of rubber such as latex, or other impregnation, coating, compounding, or treating materials which have a tendency to adhere to drying rolls or drums. The invention is of especial utility in the impregnation of tire building fabric preparatory to the application of a skim coating of rubber to the fabric by the usual calendering operation, or in the impregnation and coating of tire building fabric with latex or other rubber or resinous compounds eliminating the calendering operation.

The chief objects of the invention are to provide in an improved manner for the drying of fabric impregnated when rubber latex or resinous liquid compound; to effect the drying at the same speed that the fabric is impregnated and skim coated so that these operations may be continuous; and to provide for the control of the humidity of the drying medium. More specifically, the invention aims to provide drying apparatus wherein both sides of the coated or impregnated fabric are subjected to currents of heated air at all times; to provide against fouling of the fabric-supporting means by the composition with which the fabric is impregnated; and to avoid marking or otherwise disturbing the deposit on the fabric. Other objects will be manifest as the specification proceeds.

Of the accompanying drawings:

Figure 3 is a section on the line 3—3 of Figure 1;

Figure 4 is a detail sectional perspective view of one element of the work-supporting means within the dryer;

Figure 5 is a similar view of another element of said work-supporting means;

Figure 6 is a vertical section through drying apparatus embodying another form of the invention, taken on the line 6—6 of Figure 7.

Figure 1:
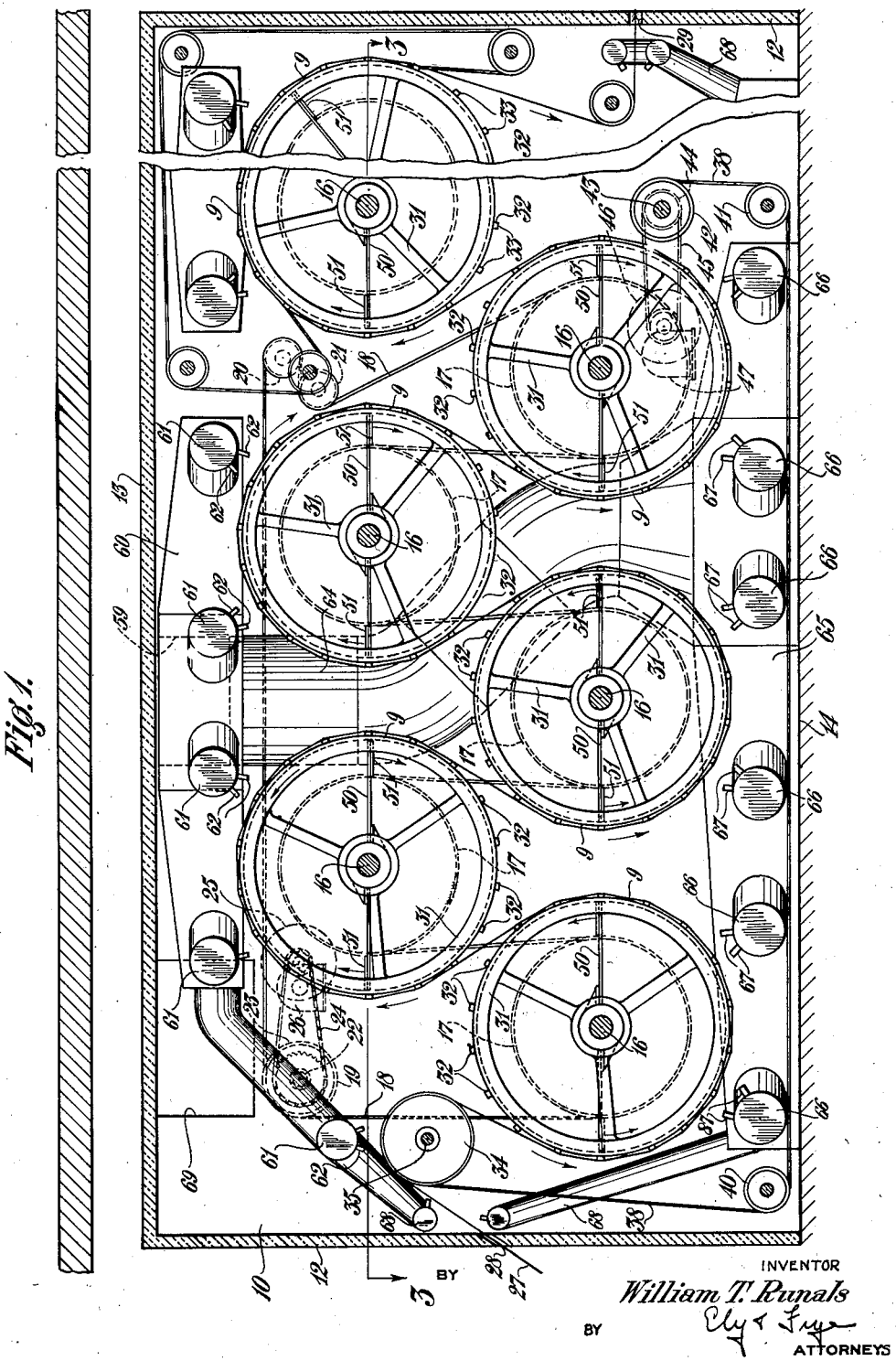
Figure 1 is a vertical section through drying apparatus embodying one form of the invention, taken on the line 1—1 of Figure 2.

Referring to the drawings, a series of drying drums, generally designated 9, are in a closed chamber or housing 10, the latter consisting of side walls 11, 11, end walls 12, 12, and top 13, said housing consisting of heat-insulating material and resting upon the floor 14.

Figure 2:
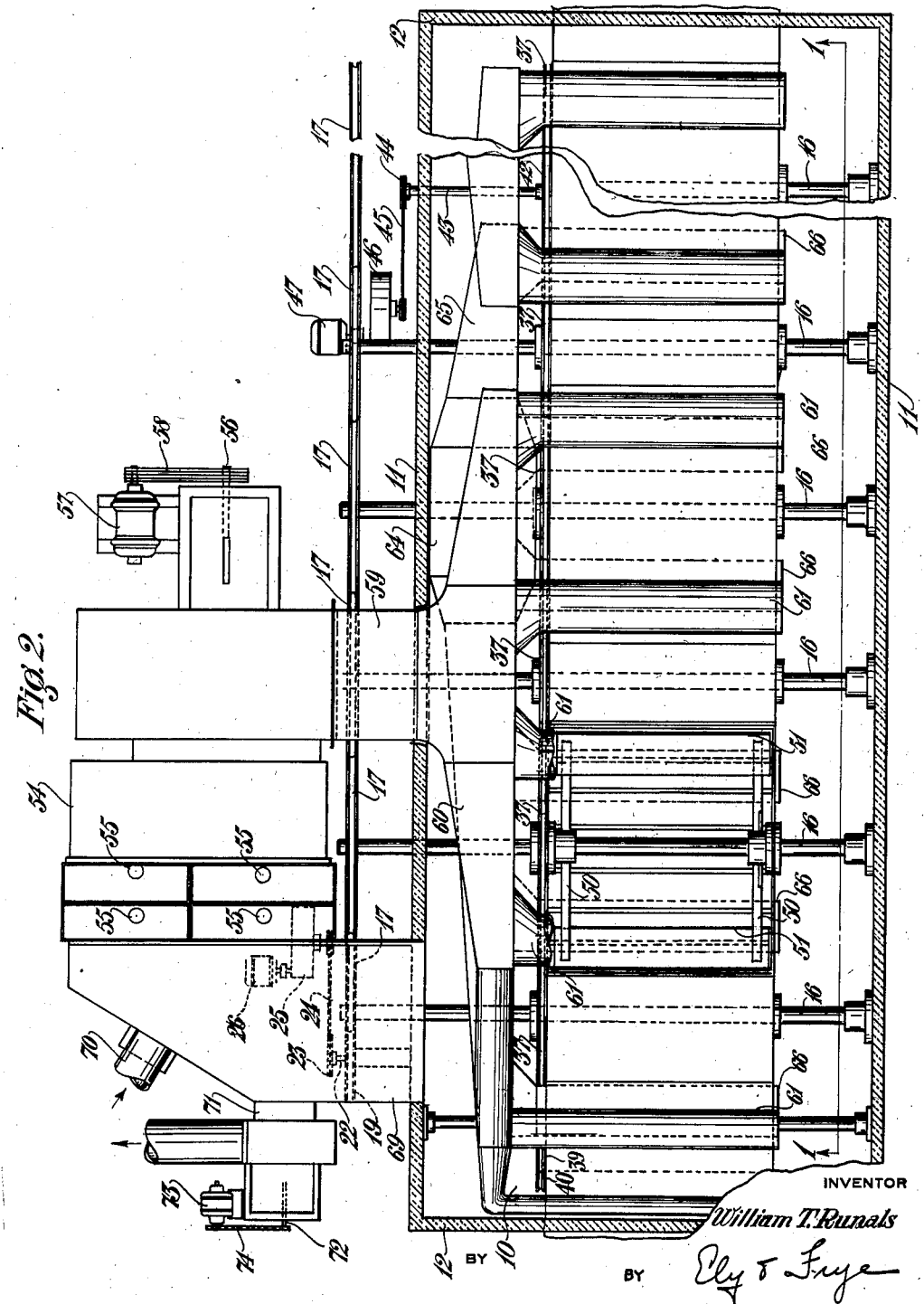
Figure 2 is a plan view of the apparatus, with top removed, parts being broken away.

Suitably journaled in bearings mounted upon the respective side walls 11 of the housing 10 are horizontally disposed shafts 16, 16 that are parallel to each other and arranged in two series at different elevations, the shafts of one series being in staggered relation to those of the other series. The adjacent ends of said shafts extend through one of the side walls 11, and are provided, exteriorly of the housing, with respective grooved sheaves or pulleys 17, 17, there being an endless driving belt, chain, or rope 18 trained about said pulleys. Said driving belt also extends about a driving pulley 19 and a pair of idler pulleys 20, 21 disposed in the plane of the pulleys 17, above the latter. The pulley 19 is mounted upon a shaft 22 with a sprocket 23 that is operatively connected, by sprocket chain 24, with a reduction gear device 25 that is driven by a motor 26 in the usual manner. It will be seen that the belt 18 passes about five pulleys 17, which is the number herein shown for one unit of the apparatus. The chamber 10 may, however, house more than one unit of apparatus, and in Figures 1, 2, and 3 of the drawings, the shaft 16 and portion of pulley 17 shown at the right-hand end of the chamber belong to an adjacent unit of the apparatus. The drums of the second unit are provided with their own driving mechanism so that they may be driven at slower speed than the drums of the first unit to compensate for shrinkage of the material being dried, and any suitable mechanism (not shown) may be provided for maintaining the desired speed differential of the units, as will be understood. In like manner a third unit of apparatus may be positioned in the housing if desired. Furthermore, the arrangement of the drums in two horizontal series is not essential, and they may be disposed in two vertical series if desired.

Journaled upon the shafts 16, interiorly of the chamber 10, are the respective hollow drums 9 that support the continuous web of impregnated fabric within the chamber, and feed said web lengthwise from the receiving end of the chamber, which is the left end thereof as viewed in the drawings, to the delivery end thereof. Said web is designated 27, and it enters the chamber through a slot 28 formed in one end wall 12, and leaves the chamber by way of a slot 29 formed in the other end wall. Because the drums are arranged in staggered relation, the fabric web travels about them in a devious course wherein opposite sides of the web alternately engage the surface of the drum, the web making contact with the drums only at local regions of its surface.

Each of said hollow drums 9 comprises skeleton-like end members such as the spiders 31, 31, said spiders having annular rim portions that support a circumferential series of laterally spaced apart fabric supporting members 32, 32. As is shown most clearly in Figure 4, the members 32 are metal channels, and they are so mounted that their leg portions extend outwardly. Thus they have relatively small area of contact with the fabric strip 27, and are not readily fouled by the composition with which the fabric is impregnated. On drums remote from the inlet end of the housing, the metal channels 32 frequently get so hot as to mar or mark the material with which the fabric is coated or impregnated, this being especially true when the fabric is impregnated with latex. To prevent marking or otherwise disturbing this soft latex on the fabric, the channels 32 of one or more of the drums carry inserts 33 of wood, fiber, or other material of low specific heat, which inserts are disposed between the legs of the channels and are each formed with an upstanding, longitudinally extending, fabric-supporting rib 33ᵃ as shown in Figure 5. There is a power-driven guide roll 34 within the chamber 10, at the receiving end thereof, over which the fabric 27 passes before it engages said drums, said guide roll being mounted upon a shaft 35 that is journaled in suitable bearings secured to the side walls of the chamber.

The drums are arranged to be driven to effect the propulsion of the fabric web 27, and to this end the rear spider 31 of each drum has a grooved pulley 37 mounted upon the rim thereof, concentric with the shaft 16, and an endless driving belt or rope 38 is trained about said pulleys. Said belt also is trained about a pulley 39 mounted on shaft 35, about idler pulleys 40, 41 mounted in the plane of the pulleys 37 below the latter near the bottom of the chamber, and about a power driven pulley 42. The latter is mounted upon a shaft 43 that extends through the rear wall 11 of the chamber and is provided, exteriorly of the latter, with a sprocket 44 that is operatively connected by sprocket chain 45 with a sprocket on a reduction gear device 46, the latter being driven in the usual manner by a motor 47.

The motor 47 drives the fabric supporting drums 9 in opposite direction to that which the motor 26 drives the shafts 16. Each of the latter is provided with a pair of brackets 50, 50 that comprise radial arms, the free ends of said arms carrying wooden strips or blades 51 that are disposed parallel to shafts 16, interiorly of the drums. The function of the rotating blades 51 is to agitate the air within the drums so that it passes over the surface of the treated fabric 27 exposed between the members 32 and thus expedites the drying of the latter.

The drying of the fabric is effected in a warm, humid atmosphere, and the apparatus comprises means for heating air, and for circulating it within the chamber 10. To this end a heater 54 is provided outside the chamber, at the rear thereof, there being steam sections (not shown but preferably of the extended surface type), within the heater, which sections are supplied with steam through pipes shown at 55, 55. Also within the heater is a blower fan (not shown) that has a drive shaft 56 driven by a motor 57, the latter being disposed exteriorly of the heater and connected with the shaft 56 by multiple driving belts 58. The said fan forces air into the chamber 10 through an inlet duct 59 that extends through the rear wall 11 of the chamber and discharges into a manifold or header 60 that is disposed interiorly of the chamber, at the top thereof, and extends longitudinally of the chamber along one side thereof. From the header 60 branch pipes 61, 61 extend transversely across the chamber, over the upper drums and the guide roll 34, and each branch pipe is provided with a pair of delivery spouts 62, 62 that are directed at said drums and which extend longitudinally of said pipe. The arrangement is such that a plurality of jets of heated air are directed against the treated fabric carried on the surface of the upper series of drums. From the header 60 a duct 64 extends downwardly to a header 65 that rests upon the floor 14, and is provided with branch pipes 66, 66 that extend across the chamber 10, beneath the respective drums of the lower series of drums. Each branch pipe 66 is provided with a pair of longitudinally extending delivery spouts 67, 67, the arrangement being such as to direct a plurality of air jets against the fabric on the lower series of drums. There are also ducts 68 that extend from the upper and from the lower headers and discharge heated air tangentially against the fabric adjacent inlet slot 28 and outlet slot 29, the air being directed away from said slots to prevent loss of heat therethrough.

To conserve heat and preserve the proper humidity, the air within the chamber 10 is recirculated through the latter and through the heater, and to this end there is provided an outlet duct 69 that extends from the interior of the chamber to the inlet side of the heater. Also opening into this side of the heater is an inlet duct 70 through which fresh air may be introduced into the heating system, if and when desired. Communicating with duct 69 is an evacuating duct 71 within which is mounted a suction fan (not shown), the shaft 72 of said fan being driven by means of a motor 73 through the agency of a transmission belt 74. The arrangement permits control of the humidity of the air within the chamber 10, a portion of the air being withdrawn from the chamber and discharged when its humidity exceeds the desired maximum. When the chamber 10 includes more than one unit of fabric carrying drums, an additional heating unit is provided for each additional drum unit.

It is believed that the operation of the apparatus readily will be understood from the foregoing description thereof. The impregnated web moves uninterruptedly through the chamber without fouling or sticking to the elements that support and feed it, and the deposit on the web is not disturbed or mutilated. Drying of the deposit in a humid atmosphere avoids the formation of checks and cracks therein, the humidity of the air being the result of evaporation of water from the deposited composition. The feature of subjecting both faces of the impregnated fabric concurrently to currents of heated air expedites the drying of the deposit. This makes it possible to dry the web in apparatus of relatively short length, and at such speed that it is possible to interpose the drying apparatus between the impregnating apparatus and a calender or other apparatus for effecting further treatment of the fabric, and to feed the fabric therethrough in a continuous operation.

Figure 7:
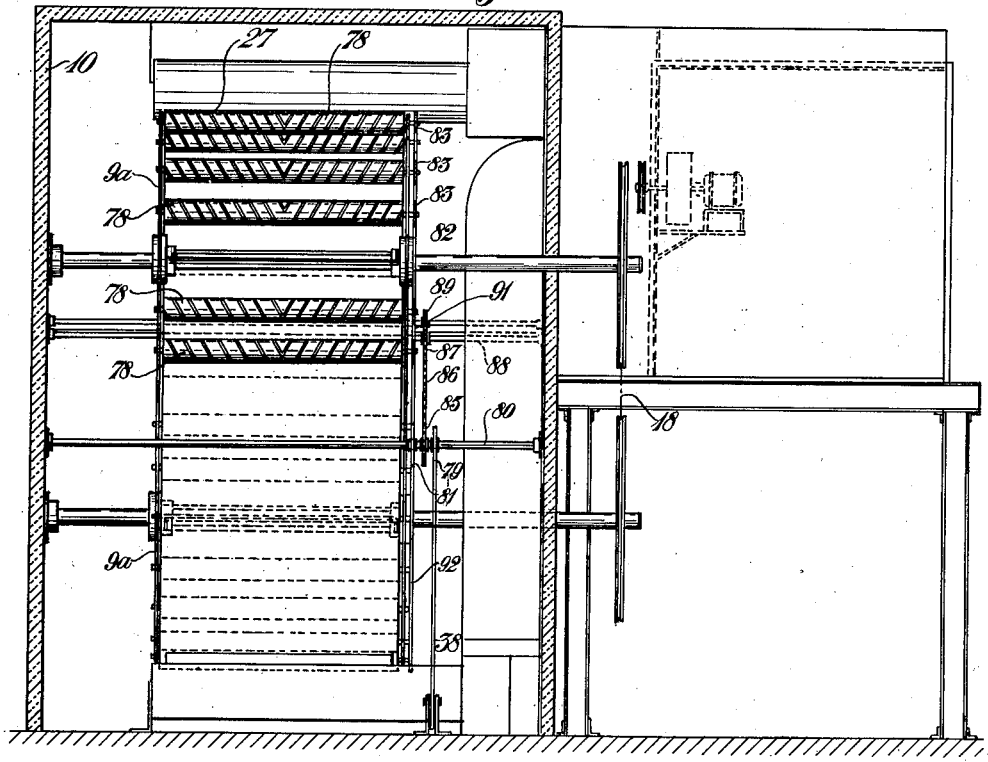
Figure 7 is an end elevation of the apparatus, taken on the line 7—7 of Figure 6.
Figure 8:
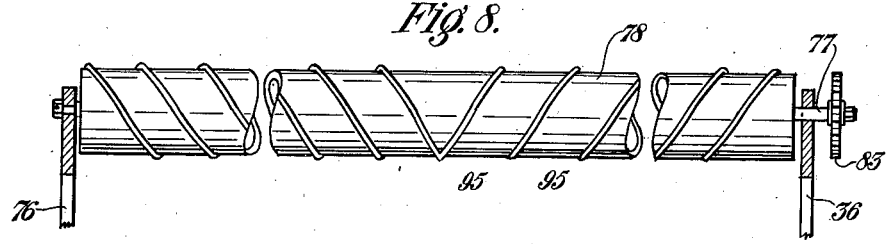
Figure 8 is a detail elevation of a feed roll employed in the apparatus of Figures 6 and 7.

Referring now to Figures 6 to 8 of the drawings, there is shown another embodiment of the invention that is essentially the same as that previously described, but differs therefrom principally in the use of improved fabric-supporting and feeding elements that engage any region of the fabric but momentarily, with the result that marking or other derangement of the deposit on the fabric is avoided. Said improved fabric-supporting and feeding elements are positioned adjacent work-receiving end of the housing 10, the incoming fabric being wettest in this region of the apparatus and hence more likely to be marred or damaged.

As shown in Figure 6, the two drums, designated 9a, 9a that are nearest the fabric inlet slot 28 are stationarily mounted, although the brackets 50 and blades 51 therein rotate in the same manner as in the previously described embodiment through the agency of the driving belt 18. Each of the drums 9a comprises skeleton-like end members such as the spiders 76, 76, and journaled in said spiders are shafts 77, 77 upon which feed rollers 78, 78 are mounted. The latter need not constitute a complete circumferential series, but only require to be located in those regions of the drums that will be traversed by the fabric 27 as it passes in a devious course about the successive drums. The rollers 78 are driven at the same surface speed as the drums 9, and to this end the drive means of the latter is utilized for driving the feed rollers 78.

The drums 9 are driven by the endless driving belt or rope 38 as in the previously described embodiment, said belt being trained about the various pulleys as shown, one of said pulleys, designated 79, being mounted upon a shaft 80 that is disposed adjacent the stationary drums 9a, 9a. Also mounted upon shaft 80 is a sprocket 81, Figure 7, and trained about the latter is a sprocket chain 82 that also passes about a series of sprockets 83 that are mounted upon the shafts 77 that carry the feed rollers 77 on the upper stationary drum 9a. Also mounted upon shaft 80, beside sprocket 81, is a sprocket 85, Figure 7, and trained about the latter is an endless sprocket chain 86 that extends about a sprocket 87 on a countershaft 88, over an idler sprocket 89, and about a sprocket 90 mounted upon the shaft 35 that carries guide roller 34. Also mounted upon countershaft 88 is a sprocket 91 about which is trained a sprocket chain 92, the latter also passing about the lower drum 9a in driving relation with sprockets 83 on the shafts that carry the feed rollers 78 of said drum. The arrangement is such that when drums 9 are rotated by the driving belt 38, the feed rollers 78 of the two stationary drums 9a, and the guide roller 34 are rotated in the proper direction and at the proper speed to feed the impregnated fabric 27 longitudinally to said drums 9.

As is best shown in Figure 8, each feed roller 78 has a pair of helically arranged ribs 95, 95 on its surface, each rib being disposed in reverse pitch each side of the middle of the roller. The feed rollers 78 are sufficiently close together on the drums that the fabric in passing over said feed rolls is disposed substantially tangentially thereto and makes contact only with the helical ribs 95. Since the rollers 78 are driven at substantial speed, (to feed the fabric at about 50 yards a minute) it will be seen that the contact of the ribs 95 with the fabric, at any one spot, is practically momentary, the points of contact constantly progressing obliquely with relation to the length of the fabric. Thus it will be seen that no point on the impregnated fabric remains long enough in contact with a rib 95 for the deposit thereon to become marred or disturbed, notwithstanding the moist, soft nature of the deposit in this region of the apparatus. The helical ribs 95 are so disposed with relation to the direction of rotation of the feed rollers that they exert a desirable tentering effect upon the fabric, but this effect is not ancillary to the primary purpose of the ribs.

Other modifications may be resorted to without departing from the spirit of the invention, or the scope thereof as defined by the appended claims.

What is claimed is:

1. Apparatus for drying a continuous moving web of wet material, said apparatus comprising a hollow, stationary drum, a circumferential series of feed rollers journaled therein for supporting and feeding said web, means for rotating said feed rollers in unison independently of the feed of the web and at the same surface speed as the latter, helically arranged ribs on said feed rollers constituting the sole web-engaging means, and means for circulating a gaseous drying medium interiorly and exteriorly of the drum.

2. Apparatus for drying a continuous moving web of wet material, said apparatus comprising a stationary drum, a circumferential series of feed rollers journalled therein for supporting and feeding said web, means for rotating said feed rollers in unison independently of the feed of the web and at substantially the same surface speed as the latter, helical ribbed means formed on said feed rollers and forming the sole web engaging means therefor, and means for circulating a gaseous drying medium around the drum.

3. Apparatus for drying a continuous moving web of wet material, said apparatus comprising a stationary substantially annular frame positioned at the portion of the apparatus first contacted by said web, a series of feed rollers journalled on said frame at circumferentially spaced points for supporting and feeding said web, said feed rollers having helical ribs thereon disposed in reverse pitch from the center of said feed rollers to spread and smooth out said web and form a minimum contact area between said feed rollers and said web, means for rotating said feed rollers in unison, and means for circulating a gaseous drying medium around said frame.

4. Apparatus as in claim 1 wherein a rotatable drum is provided to receive the web of material from said stationary drum, said rotatable drum comprising a circumferential series of spaced members disposed parallel to the axis of the said drum, and filler strips for supporting the web of material, said strips being composed of material of low specific heat and carried by the respective members and being adapted to make only line contact with the web.

5. Apparatus for drying a continuous moving web of wet material, said apparatus comprising two stationary, substantially vertically aligned cylindrical frames, a series of feed rollers journailed on said frames on the lower portion of the lower frame and the upper portion of the upper frame to enable the web of material to pass therearound in the form of a figure 8, said feed rollers having helical ribs thereon disposed in reverse pitch from the center of said feed rollers to spread and smooth out said web, means for rotating said feed rollers in unison, rotatable drums positioned adjacent said frames to receive the web of material therefrom, circumferential series of circumferentially spaced means carried by said rotatable drums, said means being constructed and arranged to support the web of material and have only line contact therewith, and means for circulating a gaseous drying medium around said frames and drums to dry the web of material.

WILLIAM T. RUNALS.

CERTIFICATE OF CORRECTION.

Patent No. 2,271,347.   January 27, 1942.

WILLIAM T. RUNALS.

It is hereby certified that error appears in the printed specification of the above numbered patent requiring correction as follows: Page 3, second column, line 16, for "not" read --only--; and that the said Letters Patent should be read with this correction therein that the same may conform to the record of the case in the Patent Office.

Signed and sealed this 24th day of March, A. D. 1942.

(Seal)

Henry Van Arsdale,
Acting Commissioner of Patents.